United States Patent [19]

Drake

[11] 4,152,291

[45] May 1, 1979

[54] REGENERATION OF PALLADIUM HYDROGENATION CATALYST

[75] Inventor: Charles A. Drake, Nowata, Okla.

[73] Assignee: Phillips Petroleum Company, Bartlesville, Okla.

[21] Appl. No.: 872,706

[22] Filed: Jan. 26, 1978

[51] Int. Cl.$^2$ .................. B01J 23/96; C07C 87/14; C07C 85/12

[52] U.S. Cl. .................. 252/416; 252/411 R; 260/583 P

[58] Field of Search .................. 252/416, 419, 411 R; 260/465.8 R, 583 P

[56] References Cited

U.S. PATENT DOCUMENTS

| | | | |
|---|---|---|---|
| 2,532,311 | 12/1950 | Howk et al. | 260/465.8 R |
| 2,532,312 | 12/1950 | Romily | 260/465.8 R |
| 2,664,404 | 12/1953 | Blatz et al. | 252/419 |
| 2,879,232 | 3/1959 | Malo et al. | 252/416 |
| 3,480,558 | 11/1969 | Lum et al. | 252/416 |
| 3,684,740 | 8/1972 | Cimbalo | 252/416 |
| 4,053,515 | 10/1977 | Drake | 260/583 P |

*Primary Examiner*—Winston A. Douglas
*Assistant Examiner*—P. E. Konopka

[57] ABSTRACT

A palladium hydrogenation catalyst, suitable for hydrogenation of an olefinically unsaturated organic compound, e.g., branched-chain, olefinically unsaturated, aliphatic dinitrile, is regenerated to remove a substantial portion of carbon-containing volatile material on the catalyst, and to reduce by oxidation a substantial portion of carbonaceous material remaining on the catalyst following which it is rapidly cooled, i.e., as fast as reasonably possible, the cooling being sufficiently rapid that the catalyst upon regeneration and reuse will be effective to considerably reduce for an extended period of time the increase in olefinic unsaturation in the hydrogenation process product.

17 Claims, No Drawings

REGENERATION OF PALLADIUM HYDROGENATION CATALYST

This invention relates to regeneration of a palladium hydrogenation catalyst. In one of its aspects it relates to the regeneration of a palladium or palladium-containing hydrogenation catalyst which has been employed in the hydrogenation of an olefinically unsaturated organic compound, e.g., a branched-chain, olefinically unsaturated, aliphatic dinitrile. In another of its aspects, the invention relates to the hydrogenation of an organic compound employing a catalyst regenerated according to the invention.

In one of its concepts, the invention provides a process for the reactivation or regeneration of a deactivated palladium catalyst by first removing a substantial portion of the carbon-containing volatile material present on the catalyst. In another of its concepts, the process is provided by the invention which in a step following removal of a substantial portion of a carbonaceous material on the catalyst by volatilizing the same at elevated temperature is then submitted to oxidizing atmosphere conditions including elevated temperature to oxidize a substantial portion of the remaining carbonaceous material present on the catalyst. In a further concept of the invention, a rapid cooling step is employed to cool the catalyst which has been subjected to the oxidizing condition as rapidly as possible and sufficiently rapidly to permit reuse for hydrogenation such that the increase in olefinic unsaturation in the hydrogenation product stream will remain quite low for extended periods of time, say, up to 18 or 20 hours or more.

In a comprehensive concept of the regeneration procedure of the invention it provides basically three steps. In a first step, a thermal treatment at elevated temperature in absence of oxygen is effected to remove carbon-containing volatile material, in a second step, the thus treated catalyst is further treated in an oxygen-containing atmosphere to oxidize a substantial portion of the remaining carbonaceous material on the catalyst, and then in a final step, the catalyst is cooled at least to the temperature at which the catalyst is to be used immediately in a hydrogenation reaction, the cooling being rapidly effected —as rapidly as is reasonably possible —the rapidity of cooling being judged by the lack of any very substantial increase in olefinic unsaturation in the hydrogenated effluent.

The invention will be described generally but in relation to the regeneration of a palladium or a promoted palladium catalyst useful in catalytic hydrogenation of branched-chain, olefinically unsaturated, aliphatic dinitrile, i.e., an organic compound containing olefinic unsaturation.

Palladium catalyst is expensive. Accordingly, a more effective procedure for the regeneration of spent or deactivated palladium hydrogenation catalysts is of considerable value in a commercial process.

Catalysts which can be regenerated by this invention have been disclosed.

An object of this invention is to provide a process for the regeneration of a deactivated palladium hydrogenation catalyst. Another object of this invention is to provide a process for the regeneration of a palladium-containing hydrogenation catalyst which has been used for the hydrogenation of an olefinically unsaturated organic compound, e.g., a branched-chain, olefinically unsaturated, aliphatic dinitrile. A further object of this invention is to provide a process for the regeneration of a used palladium-containing catalyst, which may have a promoter therein or to which a promoter may be added during regeneration, which comprises a step in which during regeneration the catalyst is particularly reactivated in a manner as to maintain low olefinic unsaturation in hydrogenation effluent for long periods of time when the regenerated catalyst is used for that hydrogenation.

Other aspects, concepts, objects and the several advantages of the invention are apparent from the study of this disclosure and the claims.

According to the present invention there is provided a process for the regeneration of a palladium-containing hydrogenation catalyst, useful in the hydrogenation of an olefinically unsaturated organic compound, catalyst which has been used having been partially regenerated to the stage at which residual carbon content thereof is sufficiently low that it can be subjected to oxidation conditions to remove substantially the remainder of carbon to reactivate the same, the step of immediately rapidly cooling said catalyst after a step in which said residual carbon has been removed by said oxidation conditions.

The steps of the invention in their presently preferred form will now be described.

It will be evident to one skilled in the art that the order of steps in the regeneration process of this invention yields unexpectedly good results even as shown in the data herein. One skilled in the art in possession of this disclosure having studied the same will be able to vary somewhat the steps of this invention in that having secured results according to this description he will know or will readily determine how he can vary the steps and conditions in each of them so as to accomplish desired results. Importantly, the third step of the invention, as these steps are lined out herein is one in which the rapid cooling is considered to be controlling. This is evident also from the data herein.

The palladium hydrogenation catalyst regeneration procedure of this invention involves three steps. These three steps are preferably carried out in the order presented below.

A. First step. The deactivated palladium catalyst is thermally treated in a substantially inert atmosphere, i.e., in absence of oxygen, to remove a substantial portion of the carbon-containing volatile material present on the catalyst. This thermal treatment is conducted at temperatures of about 550° C. to about 700° C., preferably 575° C. to 650° C. for a time sufficient to reduce the carbon content of the catalyst to below about two weight percent. The carbon content of the catalyst can be determined by elemental analysis.

In this step an inert gas, such as nitrogen or argon, is passed over the catalyst during the thermal treatment at a rate of about 0.01 to about 10, preferably 0.1 to 5 liters per minute per 50 ml of catalyst. Any pressure, including atmospheric, superatmospheric, can be used although atmospheric pressure is currently preferred for economic reasons.

B. Second step. The catalyst is then thermally treated in an oxygen-containing atmosphere to oxidize a substantial portion of the remaining carbonaceous material present on the catalyst. This thermal oxidative treatment is generally conducted at temperatures from about 550° C. to about 700° C., preferably 575° C. to 650° C. for a time, generally more than 1.5 hours, sufficient to reduce the level of carbon dioxide in the exhaust stream (as determined by vapor phase chromatography) to about 0.05 volume percent or less and the carbon content of the catalyst (as determined by elemental analysis) to about 0.25 weight percent or less.

In this step, a gas containing oxygen in amounts broadly from about 0.05 to about 20, preferably 0.1 to 10 volume percent at atmospheric pressure with an inert gas such as nitrogen is passed over the catalyst at a rate of about 0.05 to about 10, preferably 0.1 to 5 liters of gas per minute per 50 ml of catalyst. Any pressure, including atmospheric, superatmospheric, or subatmospheric, can be used although atmospheric pressure is preferred for economic reasons.

Since palladium hydrogenation catalysts containing adjuvants or promoters have higher activity and/or deactivate less rapidly than palladium catalysts without adjuvants or promoters, regeneration temperatures of about 100° C. to 150° C. or more below the values listed above for the first two steps of this regeneration procedure usually will be sufficient to return the catalyst to acceptable activity.

C. Third step. The catalyst is cooled from the temperature used in the previous step to about room temperature or, when the catalyst is to be used immediately in a hydrogenation reaction, to a temperature near the temperature of the reactor in a short period of time. This rapid cool-down is generally less than one hour for small quantities of catalyst (about 50 ml). Larger quantities may require longer times, but in all cases cool-down should be as fast as possible. The catalyst cooling rate is broadly from about 150° C. to about 700° C./hour and preferably from about 400° C. to about 650° C./hour. This cooling step can be carried out in any container or apparatus that allows the catalyst to be cooled rapidly and uniformly.

The rapid cool-down can be conducted in air, mixtures of oxygen and an inert gas, or an inert gas such as nitrogen at atmospheric or superatmospheric pressure. A flow of one of the above gases or mixtures of gases over the cooling catalyst is beneficial in cooling the catalyst and the cooling gas can itself be cooled for more effective heat removal. A liquid coolant can be used instead of a gaseous coolant to cool the catalyst. Said liquid coolant can be used at temperatures from about −50° C. to about 50° C. or at about the temperature to which the catalyst is to be cooled and at atmospheric or superatmospheric pressure.

The hydrogenation catalyst to which the instant invention is applicable include those based on palladium. For example, the catalyst can be elemental palladium, or compounds of palladium which are reducible by hydrogen to finely divided elemental palladium. Suitable hydrogen reducible compounds include the oxides, halides, nitrates, oxalates, acetates, carbamates, propionates, tartrates, hydroxides, and the like and mixtures thereof. Specific examples include elemental palladium, palladium oxide, palladium chloride, palladium nitrate, palladium oxalate, palladium acetate, and palladium hydroxide, and the like. The currently preferred palladium compounds for the preparation of the palladium catalyst of this invention are palladium acetate and palladium nitrate.

In the practice of this invention, it is preferable to employ catalytic amounts of elemental palladium on a solid catalyst carrier which does not deleteriously affect the catalytic hydrogenation process of this invention. Such supports include, for example, carbon, kieselguhr, silica, alumina, silica-alumina, calcium carbonate, asbestos, pumice, clays, and the like, and mixtures thereof. When a support is employed, the amount of palladium on the support material will generally be in the range of about 0.01 to about 10, preferably 0.1 to 5 weight percent based on the weight of the support. The supported catalysts can be prepared using any suitable procedure. Examples of suitable catalysts for a continuous process include 0.5 weight percent palladium on alumina and 1 weight percent palladium on charcoal.

Adjuvants, such as cerium, thorium, or manganese compounds, and the like, or promoters can be present with the palladium catalyst during the regeneration process of this invention.

The branched-chain unsaturated aliphatic dinitriles which are considered to be advantageously and efficiently hydrogenated in accordance with the process of this invention are the unsaturated dinitriles of the formula:

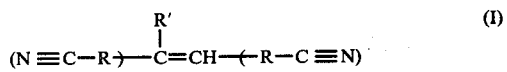

wherein each

R is independently selected from the group consisting of an alkylene radical and an alkylidene radical, and R' is an alkyl radical. Each R will generally have from 1 to 15 carbon atoms, preferably from 1 to 6, and more preferably from 1 to 3 carbon atoms. R' will generally have from 1 to 15 carbon atoms, preferably from 1 to 6 carbon atoms, and more preferably from 1 to 3 carbon atoms. In general, the unsaturated dinitrile reactant of formula (I) will contain from 7 to 30 carbon atoms, preferably from 8 to 16 carbon atoms, and more preferably from 9 to 12 carbon atoms.

Representative of unsaturated reactant species of formula (I) include such compounds as 4-methyl-3-hexenedinitrile, 4-ethyl-3-hexenedinitrile, 5-methyl-4-nonenedinitrile, 5-ethyl-4-decenedinitrile, 7-methyl-6-tridecenedinitrile, 7-methyl-6-pentadecenedinitrile, 12-methyl-12-tetracosenedinitrile, 10-hexyl-9-tetracosenedinitrile, 2,3-dimethyl-3-hexenedinitrile, 2,4,6-trimethyl-3-heptenedinitrile, 4-ethyl-6,7-dimethyl-3-octenedinitrile, 2,4,6-triethyl-3-octenedinitrile, 2-ethyl-4,6-dipropyl-3-octenedinitrile, 2-methyl-4,6,8,10-tetrapropyl-8-dodecenedinitrile, 2,4,7,9,11,13,15-heptaethyl-6-hexadecenedinitrile, and mixtures thereof.

If desired, other olefinically unsaturated dinitrile reactants can be present and effectively hydrogenated during the hydrogenation of the unsaturated dinitriles of formula (I). Thus, in addition to the unsaturated dinitrile reactants for formula (I), the dinitrile feed stock can contain one or more unsaturated dinitrile reactants of the formula:

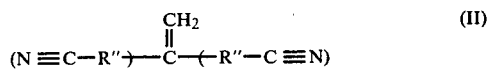

wherein each R" is independently selected from the group consisting of an alkylene radical and an alkylidene radical. In general, each R" will have from 1 to 15 carbon atoms, preferably from 1 to 7 carbon atoms, and more preferably from 1 to 4 carbon atoms. The dinitriles of formula (II) will generally contain from 6 to 30 carbon atoms, preferably from 8 to 16 carbon atoms, and more preferably from 9 to 12 carbon atoms. Representative unsaturated dinitrile reactants of formula (II) include such compounds as 3-methylenehexanedinitrile, 4-methyleneheptanedinitrile, 5-methylenenonanedinitrile, 6-methyleneundecanedinitrile, 7-methylenetridecanedinitrile, 8-methylenepentadecanedinitrile, 12-methylenetetracosanedinitrile, 15-methylenenonacosanedinitrile, 2-methyl-3-methylenepentanedinitrile, 2,4-dimethyl-3-methylenepentanedinitrile, 2-methyl-4-methyleneoctanedinitrile, 2-methyl-7-ethyl-4-methyleneoctanedinitrile, 2,4,8-trimethyl-6-methylenedodecanedinitrile, 2,4,8,10-tetrapropyl-6-methylenedodecanedinitrile, 2,26-dimethyl-14-methyleneheptacosanedinitrile, and mixtures thereof.

Unsaturated dinitriles having a structure other than that of formulas (I) and (II) can be present during the hydrogenation reaction, if desired. Similarly, other compounds which may be found in the feed source of the dinitriles of formulas (I) and (II) can be present so long as such additional compounds do not significantly adversely affect the hydrogenation of the dinitriles of formulas (I) and (II). Where other dinitriles are present in the feedstock, the dinitriles of formula (I) will generally constitute at least 0.1 weight percent of the total dinitriles. The significant advantages of the invention increase with increasing concentration of the dinitriles of formula (I) in the feedstock. Thus, the process of the invention is even more advantageous for concentrations of the dinitriles of formula (I) in the feedstock of at least 5 weight percent. The invention is considered to be particularly advantageous for dinitrile feedstocks having a concentration of the dinitriles of formula (I) of at least 10 weight percent.

A presently preferred branched-chain olefinically unsaturated aliphatic dinitrile feedstock for employment in the practice of this invention is the dinitrile reaction product mixture obtained by the reaction of isobutylene and acrylonitrile. This dinitrile reaction product mixture generally comprises 5-methyl-4-nonenedinitrile, 2,4-dimethyl-4-octenedinitrile, 2,4-dimethyl-3-octenedinitrile, 2,4,6-trimethyl-3-heptenedinitrile, 5-methylenenonanedinitrile, 2-methyl-4-methyleneoctanedinitrile, and 2,6-dimethyl-4-methyleneheptanedinitrile. The first four named compounds in this mixture are of the type of formula (I), while the last three named compounds in this mixture of the type of formula (II). The weight ratio of the dinitriles of formula (I) to the dinitriles of formula (II) in this mixture is generally in the range of about 10:1 to about 1:10.

In the practice of this invention, the catalytic hydrogenation of the unsaturated dinitrile reactant of formula (I) results primarily in the formation of saturated reaction products having the formula:

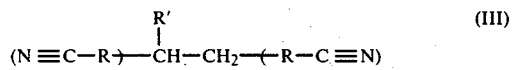

(III)

wherein R and R' are as defined hereinbefore. The catalytic hydrogenation of an unsaturated dinitrile reactant of formula (II) results primarily in the formulation of saturated dinitrile reaction products having the formula:

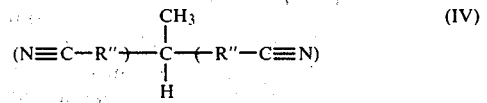

(IV)

wherein R" is as defined above.

While not critical to the regeneration process of this invention the hydrogen pressure utilized in the hydrogenation reaction is broadly from 100 to 5000 psig [0.7 to 35 megaPascals (MPa)] and preferably 500 to 3000 psig (3.5 to 20.7 MPa). The temperature utilized in the hydrogenation is broadly from about 20° to 300° C. and preferably from 25° to 150° C. The Liquid Hourly Space Velocity (LHSV) is broadly from about 0.1 to about 30, preferably 0.5 to 15 volumes of reactant plus diluent per volume of catalyst per hour.

The diluent utilized in the hydrogenation process is selected from a group consisting of aliphatic alcohols containing from 1 to 12 carbon atoms per molecule, unsubstituted acyclic and unsubstituted cyclic ethers having from 4 to 12 carbon atoms per molecule, saturated hydrocarbons having 4 to 12 carbon atoms per molecule, and aromatic and substituted aromatic compounds containing 6 to 12 carbon atoms per molecule with substituents being one or more or mixture of alkyl or alkoxy, and mixtures thereof. Specific examples of suitable diluents include methanol, ethanol, 2-propanol, 2-methyl-2-propanol, 1-octanol, pentane, decane, dodecane, cyclopentane, cyclohexane, cyclododecane, 1,3-dioxane, 1,4-dioxane, tetrahydrofuran, benzene, toluene, and the like and mixtures thereof. To facilitate handling of the reaction mixtures, the weight ratio of olefinically unsaturated reactant to diluent charged to the reactant zone is generally within the broad range of about 0.1:100 to about 50:100, and is preferably in the range of about 1:100 to 25:100.

In the examples that follow, the hydrogenation substrate which is undergoing hydrogenation is an unsaturated dinitrile mixture obtained by the reaction of isobutylene and acrylonitrile. This unsaturated dinitrile mixture comprises 5-methyl-4-nonenedinitrile, 2,4-trimethyl-3-heptenedinitrile, 5-methylenenonanedinitrile, 2-methyl-4-methyleneoctanedinitrile, and 2,6-dimethyl-4-methyleneheptanedinitrile. For convenience, the above mixture will be described as diadduct in the examples below. The above described diadduct is hydrogenated to produce a saturated dinitrile that can be further hydrogenated to yield a valuable saturated diamine for use in the preparation of polyamides and other polymers.

The deactivated palladium hydrogenation catalyst utilized in all examples except Examples II and V was prepared from a commercially available catalyst (T-1370, Girdler Catalyst Company) which contained 0.5 weight percent palladium (based on the weight of support) on an alumina support. This palladium catalyst was used in a continuous hydrogenation of diadduct in a 2" (50.4 mm) × 10' (304.8 cm) continuous reactor until catalytic activity was unsatisfactory. Portions of this deactivated palladium catalyst were then used for the hydrogenations and regenerations described below.

All regenerations were conducted with the catalyst packed in the continuous hydrogenation reactor described below. The catalyst-containing reactor was placed in an oven at the desired temperature and a gas [first nitrogen (0.75 l/min) and then an air-nitrogen mixture (0.85 l/min)] passed through the reactor. Unless otherwise stated, the air-nitrogen mixture contained 2.4 volume percent oxygen and the oxidation step was conducted until the level of carbon dioxide in the exhaust stream from the oven was below 0.05 volume percent.

For slow cool-downs, the catalyst and reactor were left in the oven and the oven heater turned off. Room temperature was reached in about 8–10 hours. For fast cool-downs, the catalyst and reactor were removed from the oven and cooled with a flow of air over the catalyst. Room temperature was reached in about 1 hour or less.

In each hydrogenation run, a 0.5″ (12.7 mm) diameter×20″ (508 mm) length continuous reactor fitted with a steam heating system and temperature recorder was charged with 40 g. (about 45 ml) of the supported catalyst, flushed with nitrogen, flushed with hydrogen at a rate of 1 liter/min., and heated to 100° C. A mixture containing 90 weight percent methanol and 10 weight percent diadduct was fed to the reactor at a LHSV of about 3. Reactor conditions during the hydrogenation runs were 1500 psig (10.3 MPa) pressure, 100° C. temperature, and 1 liter/min. hydrogen flow.

Samples were collected from the reactor effluent after 3 hours of run time and after 18 hours of run time and were analyzed for olefinic unsaturation by vapor phase chromatography after removal of the diluent under reduced pressure. Changes in catalyst activity were indicated by the difference in olefinic unsaturation present in the samples collected during the run with small differences indicating small changes in catalyst activity. Catalyst activity was indicated by the level of olefinic unsaturation present in the hydrogenation product with low levels indicating high catalyst activity.

EXAMPLE I

Several hydrogenation runs were conducted in which the olefinic unsaturation of diadduct was hydrogenated in the presence of deactivated palladium catalysts that were either untreated or that had been given various treatments for regeneration. Run 1 involved the use of a deactivated catalyst that had not been treated and the results of this run serve as a control run indicating the behavior of the deactivated palladium catalyst for comparison with runs using various regeneration treatments. The catalyst from run 2 was reused in run 3 after receiving the indicated regeneration treatment. The regeneration treatments and the hydrogenation results of these runs are shown in Table I.

Table I

| Run No. | Catalyst Regeneration Temp., °C. | Times, hours N$_2$ | N$_2$-air | Cool-down | Olefinic Unsaturation,(a) Weight % 3 hours | 18 hours |
|---|---|---|---|---|---|---|
| 1 | no regeneration | | | | 1.1 | 6.6 |
| 2 | 625 | 3 | 3 | Fast | 0(b) | 0.6 |
| 3 | 600 | 3 | 2.5 | " | 0.6 | 1.3 |
| 4 | 540 | 3 | 3 | " | 1.4 | 2.9 |

(a)Weight percent olefinic unsaturation in the hydrogenation product after the indicated number of hours during the run.
(b)No olefinic unsaturation within the limits of the analytical method.

Run 1 shows the deactivated catalyst behavior in the absence of a regeneration treatment. Invention runs 2 and 3 show lower levels of olefinic unsaturation in the first samples and smaller increases in olefinic unsaturation between the two sampling points than in the control run. Run 4 was conducted at 540° C. and shows an initial activity similar to run 1 and a smaller change in olefinic unsaturation between sampling times. Therefore, 540° C. is near the lower effective temperature for catalyst regeneration at the times indicated. Longer times could have given better results.

The results of these runs demonstrate operability of this invention for the regeneration of deactivated palladium catalysts.

EXAMPLE II

A series of runs was conducted utilizing a palladium hydrogenation catalyst that contained a cerium adjuvant. This catalyst contained 0.5 weight percent palladium and 5 weight percent cerium (based on the weight of the support) on an alumina support and was prepared by impregnating the support with palladium acetate and cerium acetate from an acetic acid solution using a rotary evaporator. The impregnated support was calcined in a furnace at 300° C. and then reduced in the presence of hydrogen. This palladium-cerium catalyst was used as the catalyst for the hydrogenation of diadduct in ten hydrogenation cycles. Each hydrogenation cycle consisted of 18 hours of hydrogenation and a catalyst regeneration at 450° C. [3 hours in nitrogen, 3 hours in an oxygen (2.4 volume percent) - nitrogen (97.6 volume percent) mixture] with a slow (8 to 10 hours) cool-down. The deactivated catalyst from the 10th cycle was regenerated by the above procedure and then reused in turn in runs 5 through 10. The regeneration conditions and hydrogenation results from these runs are shown in Table II.

Table II

| Run No. | Catalyst Regeneration Temp., °C. | Time, Hours N$_2$ | N$_2$-air | Cool-down | Olefinic Unsaturation,(a) Weight % 3 hours | 18 hours |
|---|---|---|---|---|---|---|
| 5 | 450 | 3 | 3 | slow | 1.8 | 4.3 |
| 6 | 600 | 2 | 2 | fast | 0(b) | 0.7 |
| 7(c) | 350 | 3 | 1 | fast | T(d) | 0.7 |
| | 400 | — | 1 | | | |
| | 450 | — | 1 | | | |
| 8 | 450 | 3 | 3 | fast | 0.4 | 1.3 |
| 9 | 450 | 3 | 2.5 | fast | 1.2 | 3 |
| 10 | 600 | 3 | (e) | fast | T(d) | 0.6 |

(a)Weight percent olefinic unsaturation present in the hydrogenation product after the indicated number of hours.
(b)No olefinic unsaturation present within the limits of the analytical method.
(c)The catalyst was heated at 350° C. and at 400° C. until the level of CO$_2$ was below 0.1 volume percent and at 450° C. until the level of CO$_2$ was below 0.05 volume percent.
(d)T = trace.
(e)The time was not recorded, but is believed to be 3 hours.

Run 5 shows that a regeneration procedure outside the scope of this invention results in relatively poor hydrogenation results. Regeneration of this catalyst using the procedure of this invention (run 6) resulted in high and stable activity. Later regenerations at temperatures below those of this invention (runs 7, 8, and 9) gave initially good results (presumably as a result of the high temperature regeneration of run 6) but progressively lower activity after each low temperature-fast cool-down regeneration. High activity was restored to the catalyst by a regeneration using the procedure of this invention (run 10).

The results of these runs demonstrate operability of this invention for the regeneration of a palladium hydrogenation catalyst containing a cerium adjuvant.

EXAMPLE III

Two runs were conducted in which a deactivated palladium catalyst was first regenerated by a procedure outside the scope of this invention and utilized for a hydrogenation of diadduct (run 11). This same catalyst was then regenerated by a procedure within the scope of this invention and utilized for another hydrogenation of diadduct (run 12). The regeneration conditions and hydrogenation results for these runs and run 1, which is included for comparison, are presented in Table III.

Table III

| Run No. | Catalyst Regeneration | | | | Olefinic Unsaturation,[a] Weight % | |
|---|---|---|---|---|---|---|
| | Temp., °C. | Time, hours | | | | |
| | | $N_2$ | $N_2$-air | Cool-down | 3 hours | 18 hours |
| 1 | | no regeneration | | | 1.1 | 6.6 |
| 11 | 350 | 3 | 3.5 | slow | 1.6 | 5.7 |
| 12 | 600 | 3 | 2.5 | fast | 0.3 | 0.8 |

[a]See footnote (a) of Table II.

The result of these runs show that a regeneration outside the scope of this invention with a low temperature and slow cool-down (run 11) gives a catalyst with an activity similar to that of the control, while a regeneration according to this invention (run 12) gave a catalyst with a high activity and a small change in activity during the run.

EXAMPLE IV

Several runs were conducted utilizing catalyst regeneration procedures outside the scope of this invention for the regeneration of a deactivated palladium catalyst. The regeneration conditions and hydrogenation results for these runs are presented in Table IV along with run 1 for comparison.

Table IV

| Run No. | Catalyst Regeneration | | | | Olefinic Unsaturation,[a] Weight % | |
|---|---|---|---|---|---|---|
| | Temp., °C. | Time, hours | | | | |
| | | $N_2$ | $N_2$-air | Cool-down | 3 hours | 18 hours |
| 1 | | no regeneration | | | 1.1 | 6.6 |
| 13 | 600 | 2 | 2 | slow | 1.5 | 5.8 |
| 14 | 600 | 2 | 3[b] | slow | 1.1 | 4.1 |
| 15 | 600 | 2 | 1[c] | fast | 3.0 | 6.8 |
| 16 | 350 | 3 | 6[d] | fast | 3.3 | 7.5 |

[a]See footnote (a) of Table I.
[b]One hour in a gas containing 0.8 volume percent $O_2$ and 2 hours in a gas containing 2.4 volume percent $O_2$.
[c]$CO_2$ level in the exhaust stream from the oven not determined.
[d]Four hours in a gas containing 2.4 volume percent $O_2$ and 2 hours in a gas containing 3.4 volume percent $O_2$.

The results of these runs show that the use of a fast cool-down is critical (runs 13 and 14) and that regeneration times (run 15) and temperatures (run 16) outside the scope of this invention yield catalysts with low activity.

EXAMPLE V

A run was conducted to determine the changes in carbon content of the catalyst during the catalyst regeneration procedure of this invention. An unused commercial palladium catalyst (T1370, Girdler Catalyst Company), which contained 0.5 weight percent palladium (based on the weight of support) on an alumina support, was utilized for the hydrogenation of diadduct for 19 hours. The used catalyst contained 3.63 weight percent carbon by elemental analysis. The catalyst was thermally treated at 600° C. in nitrogen for 3 hours and was found to contain 1.77 weight percent carbon. Following a thermal treatment at 600° C. for 2.5 hours in a flowing air-nitrogen mixture (2.4 volume percent oxygen) and a fast cool-down, the catalyst contained 0.16 weight percent carbon.

The results of this run show that the catalyst regeneration procedure of this invention using conditions used in runs 3 and 12 lowered the carbon content of a deactivated palladium catalyst from 3.63 weight percent to 0.16 weight percent.

From the foregoing, it will be evident to one skilled in the art in possession of this disclosure, having studied the same, that the cooling which has been practiced requires of the order of about less than 20 percent of the time now usually taken in the art. While the percentage is derived based upon regenerated catalyst of about 45 cm³ (about 40 g.), it should be understood that similar relationships are obtainable with different volumes and/or shapes of catalytic masses. Indeed, for each catalyst, volume, shape, etc., the invention results in extending the time during which the olefin content in the effluent will remain substantially lower than when the now usual cooling following regeneration is practiced.

Reasonable variation and modification are possible within the scope of the foregoing disclosure and the appended claims to the invention the essence of which is that there has been provided a process for the regeneration of a palladium-containing hydrogenation catalyst, particularly suited to the hydrogenation of an olefinically unsaturated organic compound, e.g., a branched-chain, olefinically unsaturated, aliphatic dinitrile, the regeneration involving essentially several steps including, importantly, a rapid cooling following an oxidation treatment of the catalyst and that, therefore, an improved process for the hydrogenation of such a compound has been provided, at least in the sense that the catalyst remains active for such hydrogenation for considerably longer periods of time.

What is claimed is:

1. In a process for the regeneration of a palladium-containing hydrogenation catalyst, used for the hydrogenation of an olefinically unsaturated organic dinitrile compound, wherein the catalyst which has been used is partially regenerated in an inert atmosphere in the absence of oxygen to the stage at which residual carbon content thereof is sufficiently low that it can be subjected to an oxidation step to remove substantially the remainder of carbon to regenerate or reactivate the same, and performing said step of oxidation, the step of rapidly cooling said catalyst, the cooling being sufficiently rapid that the olefinic content of hydrogenation effluent upon reuse of the catalyst will remain quite low for extended periods of time.

2. A process according to claim 1 wherein the cooling is effected with at least one substance selected from air and mixtures of oxygen and an inert gaseous substance.

3. A process according to claim 1 wherein the cooling, at least down to a temperature at which the catalyst is to be used for hydrogenation, is effected as fast as is reasonably possible and in order to maintain in hydrogenation effluent upon reuse of the catalyst for extended periods of time a low olefinic unsaturation content.

4. A process for the hydrogenation of an olefinically unsaturated organic compound in the presence of a palladium hydrogenation catalyst which is regenerated and reused which comprises effecting regeneration of the catalyst by a process according to claim 1.

5. A process according to claim 4 wherein the compound is a branched-chain, olefinically unsaturated aliphatic dinitrile.

6. A process according to claim 5 wherein the compound is at least one which can be represented by the formula

and by the formula

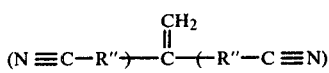

wherein R' is an alkyl radical and wherein each R and each R" is independently selected from the group consisting of an alkylene radical and an alkylidene radical and each of R, R', and R" generally will have from 1 to 15 carbon atoms.

7. A process according to claim 6 wherein the compound is at least one selected from 4-methyl-3-hexenedinitrile, 4-ethyl-3-hexenedinitrile, 5-methyl-4-nonenedinitrile, 5-ethyl-4-decenedinitrile, 7-methyl-6-tridecenedinitrile, 7-methyl-6-pentadecenedinitrile, 12-methyl-12-tetracosenedinitrile, 10-hexyl-9-tetracosenedinitrile, 2,3-dimethyl-3-hexenedinitrile, 2,4,6-trimethyl-3-heptenedinitrile, 4-ethyl-6,7-dimethyl-3-octenedinitrile, 2,4,6-triethyl-3-octenedinitrile, 2-ethyl-4,6-dipropyl-3-octenedinitrile, 2-methyl-4,6,8,10-tetrapropyl-8-dodecenedinitrile, 2,4,7,9,11,13,15-heptaethyl-6-hexadecenedinitrile, 3-methylenehexanedinitrile, 4-methyleneheptanedinitrile, 5-methylenenonanedinitrile, 6-methyleneundecanedinitrile, 7-methylenetridecanedinitrile, 8-methylenepentadecanedinitrile, 12-methylenetetracosanedinitrile, 15-methylenenonacosanedinitrile, 2-methyl-3-methylenepentanedinitrile, 2,4-dimethyl-3-methylenepentanedinitrile, 2-methyl-4-methyleneoctanedinitrile, 2-methyl-7-ethyl-4-methyleneoctanedinitrile, 2,4,8-trimethyl-6-methylenedodecanedinitrile, 2,4,8,10-tetrapropyl-6-methylenedodecanedinitrile, 2,26-dimethyl-14-methyleneheptacosanedinitrile.

8. A process according to claim 1 wherein the regeneration prior to the cooling step includes the steps as follows: 1-heating at a temperature in the approximate range of 550°-700° C. for a time sufficient to reduce the carbon content to a value of the order of about 2 weight percent under substantially nonoxidizing conditions and then 2-treating the catalyst in presence of an oxygen-containing atmosphere at a temperature in the approximate range of 550°-700° C. to oxidize a substantial portion of the carbon remaining on the catalyst.

9. A process according to claim 8 wherein the heating is continued until the level of carbon dioxide in the stream of gases exhausted from the catalyst is reduced to at least about 0.05 volume percent and the carbon content of the catalyst to at least about 0.25 weight percent.

10. A process according to claim 8 wherein an inert gas such as nitrogen or argon is maintained in the presence of the catalyst during the time step 1 is being conducted.

11. A process according to claim 10 wherein the compound hydrogenated is at least one which can be represented by the formula

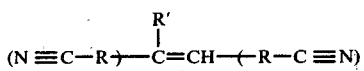

and by the formula

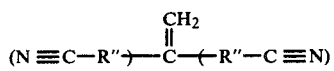

wherein R' is an alkyl radical and wherein each R and each R" is independently selected from the group consisting of an alkylene radical and an alkylidene radical and each of R, R', and R" generally will have from 1 to 15 carbon atoms.

12. A process according to claim 11 wherein the compound hydrogenated is at least one selected from 4-methyl-3-hexenedinitrile, 4-ethyl-3-hexenedinitrile, 5-methyl-4-nonenedinitrile, 5-ethyl-4-decenedinitrile, 7-methyl-6-tridecenedinitrile, 7-methyl-6-pentadecenedinitrile, 12-methyl-12-tetracosenedinitrile, 10-hexyl-9-tetracosenedinitrile, 2,3-dimethyl-3-hexenedinitrile, 2,4,6-trimethyl-3-heptenedinitrile, 4-ethyl-6,7-dimethyl-3-octenedinitrile, 2,4,6-triethyl-3-octenedinitrile, 2-ethyl-4,6-dipropyl-3-octenedinitrile, 2-methyl-4,6,8,10-tetrapropyl-8-dodecenedinitrile, 2,4,7,9,11,13,15-heptaethyl-6-hexadecenedinitrile, 3-methylenehexanedinitrile, 4-methyleneheptanedinitrile, 5-methylenenonanedinitrile, 6-methyleneundecanedinitrile, 7-methylenetridecanedinitrile, 8-methylenepentadecanedinitrile, 12-methylenetetracosanedinitrile, 15-methylenenonacosanedinitrile, 2-methyl-3-methylenepentanedinitrile, 2,4-dimethyl-3-methylenepentanedinitrile, 2-methyl-4-methyleneoctanedinitrile, 2-methyl-7-ethyl-4-methyleneoctanedinitrile, 2,4,8-trimethyl-6-methylenedodecanedinitrile, 2,4,8,10-tetrapropyl-6-methylenedodecanedinitrile, 2,26-dimethyl-14-methyleneheptacosanedinitrile.

13. A process according to claim 1 wherein the catalyst contains an adjuvant.

14. A process according to claim 13 wherein an adjuvant is selected from cerium, thorium, or manganese compound.

15. A process according to claim 1 wherein the catalyst is at least one selected from elemental palladium and a compound of palladium reducible by hydrogen to finely divided palladium.

16. A process according to claim 15 wherein the catalyst is prepared from at least one of palladium acetate and palladium nitrate.

17. A process for the regeneration of a palladium-containing hydrogenation catalyst, which has been used for the hydrogenation of an olefinically unsaturated organic dinitrile compound which comprises partially regenerating the used catalyst in an inert atmosphere in the absence of oxygen at a temperature in the approximate range of 550°-700° C. for a time sufficient to reduce the carbon content of the catalyst to a value of the order of about 2 wt. %, then subjecting the catalyst to an oxidation step employing an oxygen-containing atmosphere at a temperature in the approximate range of 550°-700° C. to oxidize a substantial portion of the carbon remaining on the catalyst and then rapidly cooling said catalyst at least down to a temperature at which it is to be used for hydrogenation of additional organic nitrile.

* * * * *